(No Model.) 2 Sheets—Sheet 2.

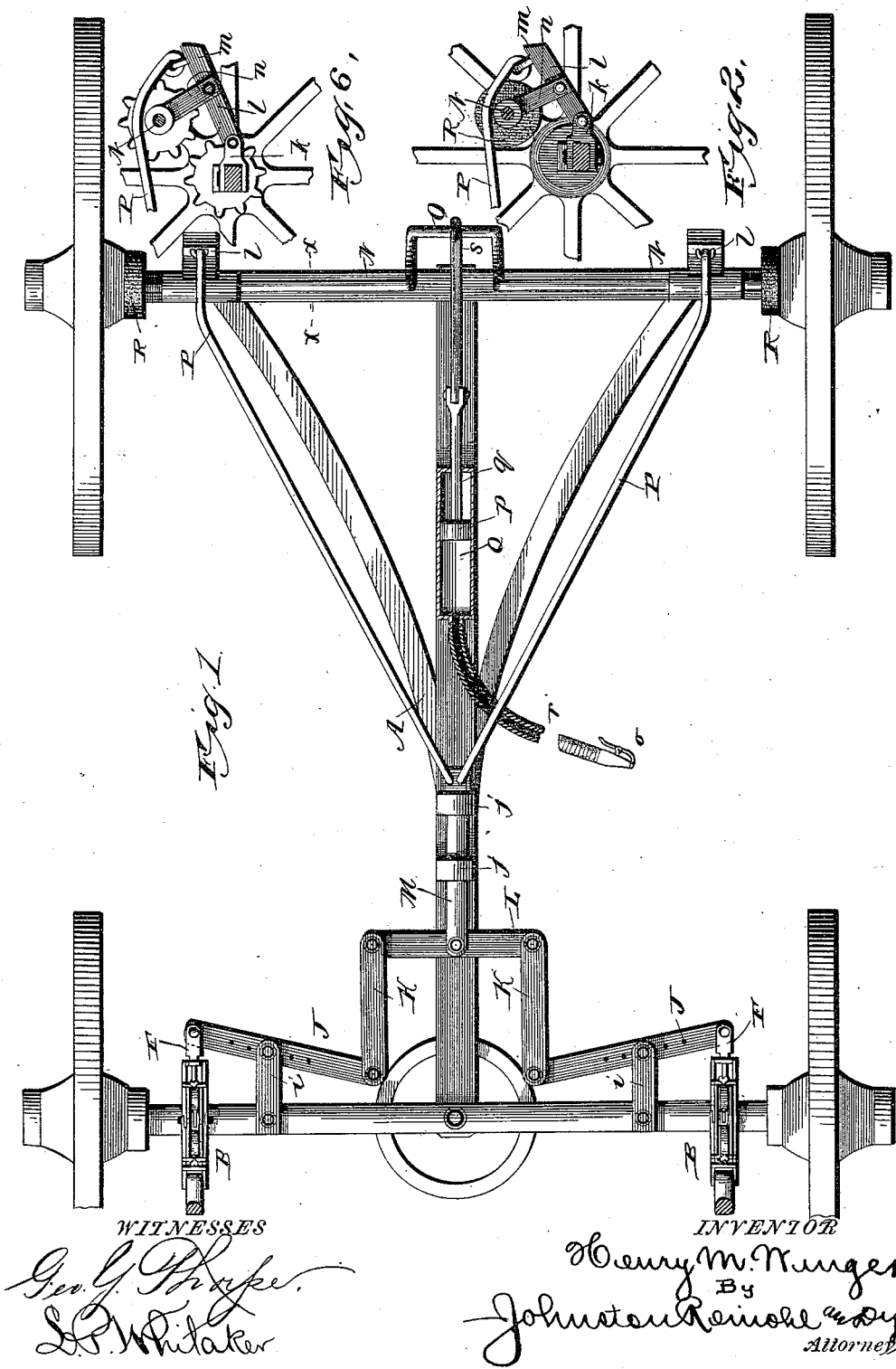

H. M. WINGERT.
VEHICLE BRAKE.

No. 428,361. Patented May 20, 1890.

WITNESSES:
Geo. G. Thorpe.
L. S. Whitaker.

INVENTOR
Harry M. Wingert
BY
Johnston Renohl & Dyre
ATTORNEYS.

UNITED STATES PATENT OFFICE.

HENRY MILTON WINGERT, OF BERRYSBURG, PENNSYLVANIA.

VEHICLE-BRAKE.

SPECIFICATION forming part of Letters Patent No. 428,361, dated May 20, 1890.

Application filed November 2, 1889. Serial No. 328,988. (No model.)

*To all whom it may concern:*

Be it known that I, HENRY MILTON WINGERT, a citizen of the United States, residing at Berrysburg, in the county of Dauphin and State of Pennsylvania, have invented certain new and useful Improvements in Vehicle-Brakes; and I do hereby declare the following to be a full, clear, and exact description of the invention, such as will enable others skilled in the art to which it appertains to make and use the same.

My invention relates to air-brakes, and has for its object the production of a brake applicable to light and heavy draft vehicles, but especially designed for use on buggies.

The invention will be hereinafter described, and particularly pointed out in the claims.

Figure 3:
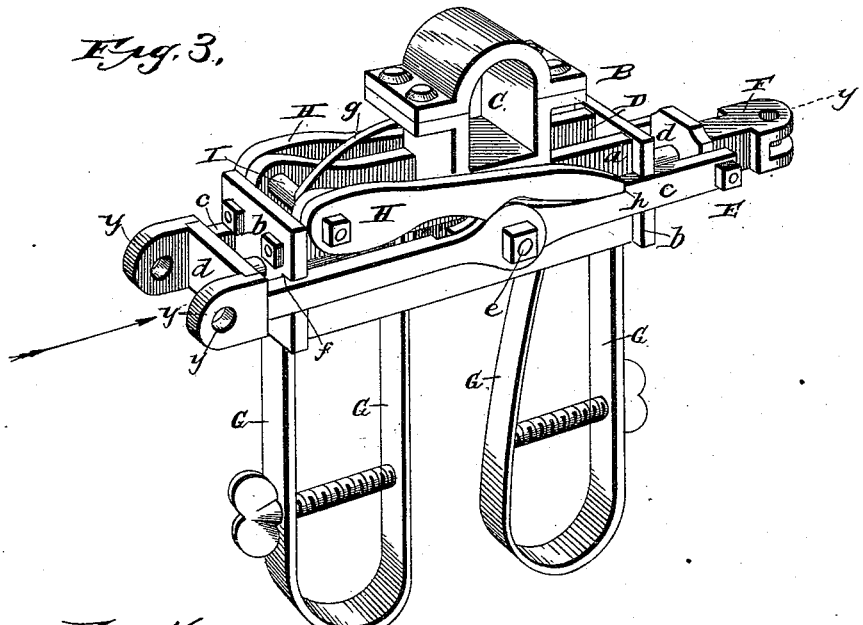
Figure 4:
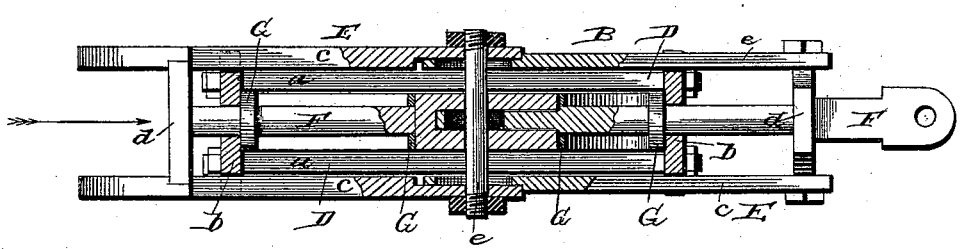
Figure 5:
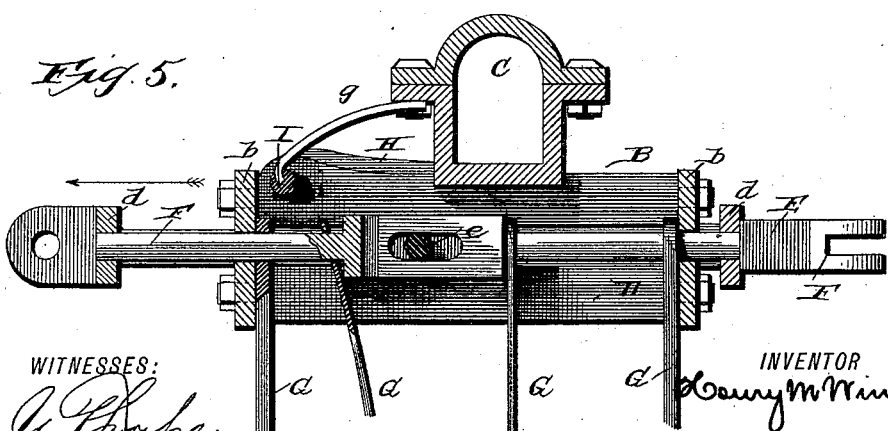

In the accompanying drawings, which form part of this specification, Figure 1 represents an inverted plan view of the running-gear of a vehicle equipped with my brake in its applied position; Fig. 2, a vertical section through the rear axle at $x\ x$, showing the brake disengaged. Fig. 3 is a perspective view of a thill-coupling designed for use with my invention; Fig. 4, a horizontal section on line $y\ y$, Fig. 3; Fig. 5, a vertical longitudinal section of same, and Fig. 6 a modified form of hub and attachment.

Reference being had to the drawings and the letters thereon, A indicates the running-gear of a vehicle, and B thill-couplings rigidly secured to the front axle, as shown in Fig. 1, whereby the shafts or a tongue are attached.

Couplings B consist of an ordinary boxing C, which encircles the axle and is bolted thereon, having attached thereto a device for operating my improved brake. This device consists, mainly, of two frames D and E, frame D being rectangular in form and made of four parallel bars $a$, joined at their ends by a square piece of metal $b$, to which they are bolted. Frame E consists of two parallel sides $c$, connected at their ends in like manner to frame D by blocks $d$, while through the entire longitudinal center of the two frames projects a rod F, the object of which will be hereinafter described.

Frame E and rod F are made in two parts bolted together in the center by the bolt $e$, which operates in elongated slots, thus allowing for a lateral movement of these two parts with reference to each other. Frame E is longer than frame D, and is arranged to partly inclose or telescope it, the rod F passing through apertures formed in the heads $b$ of frame D and through the entire longitudinal center thereof, while the sides $c$ of frame E rest in slots $f$, formed in opposite sides of heads $b$, wherein they are free to reciprocate.

Extending below the device are two U-shaped leaf-springs G, one side of which bears against the inside of heads $b$ on frame D, while the opposite sides thereof bear against enlargements on the inner ends of the two sections of rod F, against which said springs exert their power to hold the frame E in its reduced or partially-collapsed condition. In one side of each of springs G is a set-screw, which bears against the opposite side of the spring for the purpose of regulating the tension thereof.

On either side of parallel bars $a$ are dogs or levers H, secured rigidly to a shaft I, journaled loosely in the end of two of the parallel bars $a$ and operated upon by spring $g$, which holds the extremities of said levers H normally in contact with the upper surface of sides $c$, constituting part of frame E, so that when the latter is advanced slightly said levers will engage niches $h$, as will hereinafter appear.

At a convenient position on the under side of the front axle of a vehicle I secure lugs or supports $i$, forming fulcrums for levers J, one end of each of which latter engages with rod F of thill-coupling B and the other with links K, which communicate the motion of said levers to a bar L, connecting the ends of links K. To the center of bar L is swiveled a rod M, supported and free to reciprocate in bearings $j$, secured to the under side of the coupling-pole. To the back of the rear axle I secure two lugs $k$, in which are swiveled frames $l$, consisting of rod $m$, having a branch $n$ rigidly secured to its center and projecting almost at right angles therefrom, while in the outer ends thereof are bearings for the shaft N, with a double crank O formed in its center, and both ends equipped with circular friction-disks R of rubber, wood, or other frictional substance, for the purpose hereinafter described.

To the upper ends of the frames $l$ are secured by staples rods P, the opposite ends of which are connected to rod M, as shown in Fig. 1, which figure also represents a sectional view of an air-compressor Q, fastened to the under side of the coupling-pole, and provided at one end with an escape-pipe $r$, guarded by a stop-cock $o$, located in the wagon-body. In the opposite end of compressor Q is a piston $p$, the rod $q$ of which passes through the head of the cylinder and connects with crank O through the medium of link $s$.

The construction and arrangement of parts being substantially as described, the operation is as follows: Upon approaching a hill or grade in descending which it is desired to apply my automatic brake, the horse is checked, as usual, which has the effect of operating upon rods F of the couplings B through the medium of shafts or a tongue, forcing it back, together with the frame E, until it reaches the position shown in Fig. 1, when the dogs or levers H, journaled to frame D, will drop into niches $h$ on the upper surface of frame E, thus locking the two frames in this relative position, with the rods F extended in a manner to force the outer ends of levers J back, and thereby bring links K, bar L, and rods M and P P forward. This movement has the effect of drawing the friction-disks R in contact with the hubs of the rear wheels through the medium of frames $l$, swiveled at their lower ends to the axle. Shaft N will now revolve rapidly and through the double crank O in its center reciprocate the piston-rod $q$, whereby air is forced into and compressed in the cylinder Q, thus affording a resistance to the progress of the vehicle. The amount of resistance may be regulated by the escapement of air through the pipe $r$, controlled by the stop-cock $o$ in the hand of the driver. When there is no further use for a brake, the resistance may be destroyed in the manner described, or the same may be accomplished automatically by tension on frame E of the coupling B when the horse again begins to pull, as the inclines on the upper surface of said frames will engage the projections on the under side of dogs H, disengaging the latter, reversing the whole operation of the levers before described, and throwing the friction-disks R out of contact with the hubs.

It is obvious that without departing from the spirit of my invention I may substitute a cog-gear, as shown in Fig. 6, for the friction-gear described for use on heavy vehicles, or I may employ one or more air-compressors, or arrange rubbers to operate upon the periphery of the wheels against which they may be thrown by the action of a plunger placed in the cylinder.

Having thus described my invention, what I claim is—

1. In a vehicle-brake, the combination of an air-compressor provided with an escape-pipe guarded by a stop-cock for regulating the pressure, a piston, and a piston-rod reciprocated by a crank formed on a shaft, the opposite end of which is provided with a roller in frictional contact with the hub of a wheel, substantially as described.

2. In a vehicle-brake, the combination of an air-compressor, a piston, and a piston-rod reciprocated by a crank formed on a shaft, the opposite end thereof bearing a friction-roller, and means for throwing the same in and out of contact with the hub, substantially as described.

3. In a vehicle-brake, the combination of an air-compressor, a piston, and a piston-rod reciprocated by a crank formed on a shaft, which is supported in a frame or frames hinged to the rear axle and provided at its outer end with a friction-roller adapted to be thrown in and out of contact with the hub of a wheel, substantially as described.

4. In a vehicle-brake, an air-compressor, a piston, and a piston-rod reciprocated by a crank formed on a shaft, which is supported in a frame or frames hinged to the rear axle and provided at its outer end with a friction-roller, in combination with a rod or rods secured to the frame or frames at one end and to a pair of shafts or a tongue at the opposite end, for the purpose of rocking the frames and throwing the roller in and out of contact with the hub, substantially as described.

5. In a vehicle-brake, an air-compressor, a piston, and a piston-rod reciprocated by a double crank formed on a shaft which is supported in frames hinged to the rear axle and provided at its outer ends with friction-rollers, in combination with rods secured to said frames at one end and to a pair of shafts at their opposite ends, for the purpose of rocking the frames and throwing the rollers in and out of contact with the hub, substantially as described.

6. In a brake mechanism, thill-couplings, each provided with a rod passing through the body thereof, to one end of which are attached the shafts or a tongue and to the other a lever fulcrumed on the front axle for communicating motion to the brake mechanism, substantially as described.

7. A thill-coupling for vehicles, consisting of a clip by which it is secured to the front axle and a frame attached thereto provided with a rod passing through the body thereof and connected at one end to the thills and at the opposite end to an operating-lever, in combination with a brake mechanism, substantially as described.

8. A thill-coupling for vehicles, consisting of a clip by which it is secured to the front axle, a frame attached thereto supporting a second frame made in two parts adjustable longitudinally with reference to each other and held normally in their extended position by springs, one end of the latter frame being secured to the thills and the other end to an operating-lever, in combination with a brake mechanism, substantially as described.

9. A thill-coupling for vehicles, consisting of a clip by which it is secured to the front axle, a frame attached thereto supporting a second frame made in two parts adjustable longitudinally with reference to each other and held normally in their extended position by springs provided with set-screws for regulating the tension thereof, one end of the latter frame being secured to the thills and the other end to an operating-lever, in combination with a brake mechanism, substantially as described.

10. A thill-coupling for vehicles, consisting of a clip by which it is secured to the front axle, a frame attached thereto on which is journaled a dog for engagement with a niche in the upper surface of a second frame supported by the first, the secondary frame being made in two parts adjustable longitudinally with reference to each other, held normally in their extended position by springs, and being attached at one end to the thills and at the other to an operating-lever, in combination with a brake mechanism, substantially as described.

11. A thill-coupling for vehicles, consisting of clips by which they are secured to the front axle, a frame attached thereto on which are journaled dogs for engagement with niches in the upper surface of a second frame supported by the first, a spring for holding said dogs in contact with the second frame, which latter is made in two parts adjustable longitudinally with reference to each other and are held normally in their extended position by springs, having attached to one end thereof thills and to the other an operating-lever, in combination with a brake mechanism, substantially as described.

12. A thill-coupling for vehicles, consisting of clips by which they are secured to the front axle, a frame attached thereto on which are journaled dogs for engagement with niches in the upper surface of a second frame supported by the first, a spring for holding said dogs in contact with the second frame, which latter is made in two parts adjustable longitudinally with reference to each other, provided with inclines for disengaging the dogs, and springs for holding the parts normally in their extended position, and having attached to one end thereof thills and to the other an operating-lever, in combination with a brake mechanism, substantially as described.

In testimony whereof I affix my signature in presence of two witnesses.

HENRY MILTON WINGERT.

Witnesses:
   H. A. NEITZ,
   JNO. W. JURY.